Patented Feb. 17, 1931

1,793,342

UNITED STATES PATENT OFFICE

JOHN T. TRAVERS, OF COLUMBUS, OHIO, ASSIGNOR, BY DIRECT AND MESNE ASSIGNMENTS, TO THE OHIO SANITARY ENGINEERING CORPORATION, OF COLUMBUS, OHIO, A CORPORATION OF OHIO

PROCESS FOR PURIFYING ACID WASTE AND RECOVERING VALUES THEREFROM

No Drawing.   Application filed October 17, 1927.   Serial No. 226,827.

This invention relates to a process for the purification of what are commonly known as the waste liquors from pickling vats, employed in steel mills. These waste liquors contain constituents which render them of a high polluting and dangerous character, and they cannot be discharged into flowing streams or bodies of water without destroying aquatic life and effecting pollution of the stream. The chief polluting constituents contained in these waste liquors are sulphuric acid, and the iron salts, usually present as $FeSO_4$. However, some ferric iron may also be present. The acid content of the waste will vary between wide limits. In some instances the acid content is slight as, for example, as low as 1%, while in other instances it is known to run as high as 16%. The ferrous sulphate content of the waste also varies between wide limits, and is found to vary between substantially the same limits as the quantity of sulphuric acid, namely, from 1% to 16%. The polluting effect of the acid is due to the fact that it destroys the alkalinity of the stream, killing aquatic life, since fish require a degree of alkalinity sufficient to give pH in excess of 7. The $H_2SO_4$ also accelerates the consumption of dissolved oxygen from the stream by such organic substances as may be contained therein, and functions as a catalyst accelerating the oxidation of the iron salts. The polluting effect of the ferrous sulphate content of the waste is due to the fact that the ferrous sulphate takes up dissolved oxygen from the stream in the process of oxidation from the ferrous to the ferric state, in accordance with the following reaction:—

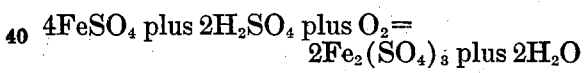

The ferric sulphate hydrolyzes as follows:

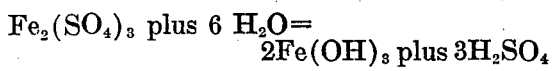

This reaction shows that the $FeSO_4$ also produces an additional quantity of polluting $H_2SO_4$.

The ferrous sulphate also has the further polluting effect of causing incrustating deposits of iron on the bed of the stream, as well as upon any dams or the surface of vessels in the stream.

It will be appreciated that in order to adequately purify this waste, it is necessary to both neutralize the acid content thereof and remove the iron content therefrom. This process, therefore, contemplates both the neutralization of the acid content and the removal of the iron salts, effecting complete purification of the waste as well as a precipitated sludge of high value. This sludge is peculiarly suited as a reagent for treating polluted organic wastes containing putrescible organic matter in colloidal form.

In carrying out the process, when the acid waste is discharged from the pickling vats in a highly heated condition for treatment in my process and also constitutes a saturated solution of ferrous sulphate, it is found desirable to deliver the same to a cooling basin to permit the waste to reach normal temperature. Upon such cooling of the waste, a large quantity of the ferrous sulphate crystallizes from the solution. If the waste is not a saturated solution of ferrous sulphate, the necessity for the cooling step is, to some extent, eliminated, and in such instances the waste may be at once delivered to a suitable treating tank. I preferably employ in carrying out the process, a treating tank of substantially 10,000 gallons capacity. The waste solution introduced to the tank is treated with a mixture comprising, substantially 80 parts of a solid waste recovered from an alkali plant in the manufacture of chloride of lime, chlorine and caustic soda, and 20 parts of calcium hydroxide. These constituents of the mixture may vary as much as 10% either way. Or, I may substitute, in lieu of the solid waste recovered from the alkali plant, an equal quantity of finely ground travertine, both of which constituents possess a high content of calcium carbonate. This mixture should be incorporated in the waste solution in proportions of from substantially 135 to 150 pounds of the mixture to each 100 pounds of acid present in the waste. The acid content of the waste may, of course, be readily ascertained by analysis and the amount of treating mixture gauged accordingly. It will be understood that the liquid is agitated following the introduction of the treating mixture for the purpose of intimately incorporating the same therein. The treating mixture effects a complete neutralization of the acid content of the waste and a partial precipitation of the iron content of the waste. The effluent produced is completely neutralized and the iron content reduced to such an extent that it is negligible as a polluting constituent. The effluent may be discharged into a stream without danger of pollution or deleterious effects on aquatic life.

As above set forth, the waste usually contains sulphuric acid and ferrous sulphate. The reagents employed to treat the waste contain substantial quantities of calcium hydroxide and calcium carbonate. There results from the reactions effected by treatment of the waste with these materials the formation and precipitation of substantial quantities of calcium sulphate. The calcium sulphate is formed by the reaction between the calcium hydroxide and the sulphuric acid according to the following formula:—

$$Ca(OH)_2 \text{ plus } H_2SO_4 = CaSO_4 \text{ plus } 2H_2O$$

A further quantity of calcium sulphate is formed as a result of the reaction between the calcium carbonate and sulphuric acid, which reaction is, $$CaCO_3 \text{ plus } H_2SO_4 = CaSO_4 \text{ plus } H_2CO_3$$

It is to be further noted that additional calcium sulphate is formed as a result of the reaction between the calcium hydroxide and the ferrous sulphate, which reaction is:

$$Ca(OH)_2 \text{ plus } FeSO_4 = CaSO_4 \text{ plus } Fe(OH)_2$$

There also separates out with the sludge a very substantial quantity of an undissolved electrolyte producing material used in the treatment of acid waste.

This undissolved electrolyte producing material consists of the excess treating reagent employed. As it is necessary to add a considerable excess of the treating agent to force to completion the reactions shown, it necessarily follows that the excess treating agent will be recovered in the sludge. As a large amount of calcium sulphate is formed, all calcium sulphate above that required to saturate the solution is also recovered in the sludge.

As illustrative of the operation of the process, a waste acid liquor from the pickling vats of a steel mill, showing upon analysis:

| | Per cent |
|---|---|
| Sulphuric acid | 2.95 |
| Ferrous sulphate | 12.4 |
| Sulphates as $SO_3$ | 7.14 | when treated with a quantity of the treating mixture above described in proportions of 135 pounds of treating mixture to each 100 pounds of acid in the waste, yielded a clarified effluent which showed upon analysis:

| | Per cent |
|---|---|
| Sulphuric acid | 0.0 |
| Ferrous sulphate | 7.2 |
| Sulphates as $SO_3$ | 3.1 |

The sludge precipitated from the waste shows upon analysis:

| | Per cent |
|---|---|
| Calcium carbonate | 41.15 |
| Calcium sulphate | 36.66 |
| Ferrous hydrate | 20.18 |
| Ferric hydrate | .86 |
| Ferrous sulphate | .32 |

This sludge possesses the capacity to form an electrolyte and has a value in excess of the value of the treating mixture employed for the purification of the waste pickle liquor. This sludge is particularly adapted for purifying waste liquors containing putrescible organic matter in suspended and colloidal form. A process for treating polluted liquids containing putrescible organic matter in colloidal form forms the subject matter of my Patent No. 1,672,587 and is to treatment of liquids in accordance with the process described in said patent that the above sludge is particularly well suited.

This sludge is exceedingly stable and is characterized by the fact that when the iron salts thereof undergo oxidation, the $H_2SO_4$ formed as a result of such oxidation is at once neutralized by the calcium carbonate present in the sludge.

The method of recovering the sludge is substantially as follows:—The sludge is passed from the treating tank to a suitable underdrained sludge bed of more or less conventional design for dewatering. The dewatered sludge is thence passed through a rotary drier so constructed as to discharge the sludge in a dry, pulverized condition.

An analysis of a typical waste from an alkali plant is as follows:—

| | Per cent |
|---|---|
| Silica | 1.90 |
| Ferric oxide | 2.24 |
| Ferric sulphate | .78 |
| Aluminum oxide | .13 |
| Aluminum sulphate | .08 |
| Potassium chloride | .06 |
| Sodium chloride | 1.37 |
| Calcium chloride | 1.83 |
| Calcium sulphate | 1.34 |
| Calcium carbonate | 74.80 |
| Calcium hydroxide | 11.71 |
| Magnesium carbonate | 4.10 |

It is to be understood that the terms "waste material" and "waste product" as employed in the claims have reference to the solid waste of an alkali plant recovered from the waste solutions discharged from such plant in the manufacture of chlorine, chloride of lime and caustic soda and contemplate a substance containing ionizable salts of calcium, iron and aluminum at least equivalent to substantially 20% by weight of the material containing a substantial quantity of calcium hydroxide, a representative analysis of which substances has been hereinbefore given.

While I have described the process as utilized in the purification of waste pickle liquor, I desire it understood that the process is capable of use in treating other acid wastes as, for example, waste mine waters which have an acid reaction and a substantial content of iron salts.

The description herein contained is merely illustrative of the operation of the process and it is to be understood that I contemplate within the scope of my invention such changes and modifications as may be necessary to adapt the process to varying conditions and uses.

Having thus described my invention, what I claim is:—

1. A process for purifying waste liquors having an acid content and a content of iron salts comprising reacting on the waste liquor with a mixture of lime and a solid waste product recovered from an alkali plant, the lime and solid waste product being present in substantially the ratio of 1 to 4.

2. A process for treating acid waste containing iron salts comprising reacting on the waste with a reagent in excess of 50% of which represents a solid waste produce recovered from an alkali plant in the manufacture of chlorine, chloride of lime and caustic soda.

3. A process for treating acid waste containing iron salts comprising reacting on the waste with a reagent comprising a mixture in excess of 50% of which represents the waste product recovered from an alkali plant and containing approximately 20% calcium hydroxide.

JOHN T. TRAVERS.